United States Patent Office 3,167,548
Patented Jan. 26, 1965

3,167,548
10α - STEROID - 19 - OIC ACID (19,11)-LACTONES, 19 - CARBOXYLIC ACID (19α,11)-LACTONES AND 11α,19 - DIHYDROXY- AND 11α - HYDROXY - 19-HYDROXYMETHYL - 10α - ANDROSTENES
Alexander D. Cross, Mexico City, Mexico, assignor to Syntex Corporation, Panama, Panama, a corporation of Panama
No Drawing. Filed Jan. 10, 1963, Ser. No. 250,481
18 Claims. (Cl. 260—239.57)

The present invention relates to novel cyclopentanophenanthrene derivatives and to a process for the production thereof.

More particularly the present invention relates to a novel process for the production of 10α-steroid-19-oic and 19-carboxylic acids, to their transformation into 19-hydroxy-10α-steroids, and to novel 11α,19-dihydroxy-10α-androstanes.

It has been disclosed in the literature that the changing of the configuration in the carbon 10 of the steroid molecule enhances certain activities and confers new properties to the steroids with this abnormal configuration. For example, the 10α,9β-progesterone is several times more active than progesterone with respect to progestational and anti-estrogenic activities, as was disclosed in Belgian Patent No. 577,615, and 9α,10α-progesterone has also enhanced activities as was disclosed in Belgian Patent No. 577,616, neither of them having any androgenic effect.

In accordance with the present invention there has been discovered a new method for producing 10α-steroids from intermediates 10α-steroid-19-oic and 19-carboxylic acids. The latter acids may be transformed into 10α,9β-steroids or into the corresponding 10α,19-hydroxy steroids by conventional procedures.

The novel compounds of the present invention are represented by the following formula:

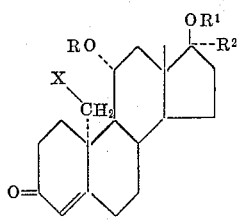

In the above formula, X may be —OR or —CH$_2$—OR; R represents hydrogen or a hydrocarbon carboxylic acyl group of less than 12 carbon atoms; R$^1$ represents hydrogen or a hydrocarbon carboxylic acyl group of less than 12 carbon atoms; and R$^2$ represents hydrogen, lower alkyl, lower alkenyl, or lower alkinyl.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel compounds of the present invention represented by the above formula are potent anabolic agents. In addition, they have anti-estrogenic, anti-gonadotrophic, anti-fibrillatory and appetite stimulating properties. Furthermore, they lower the blood cholesterol level, relieve premenstrual tension and suppress the output of the pituitary gland.

The novel process object of the present invention, by means of which there may also be produced the novel compounds represented by the above formula, is illustrated by the following scheme:

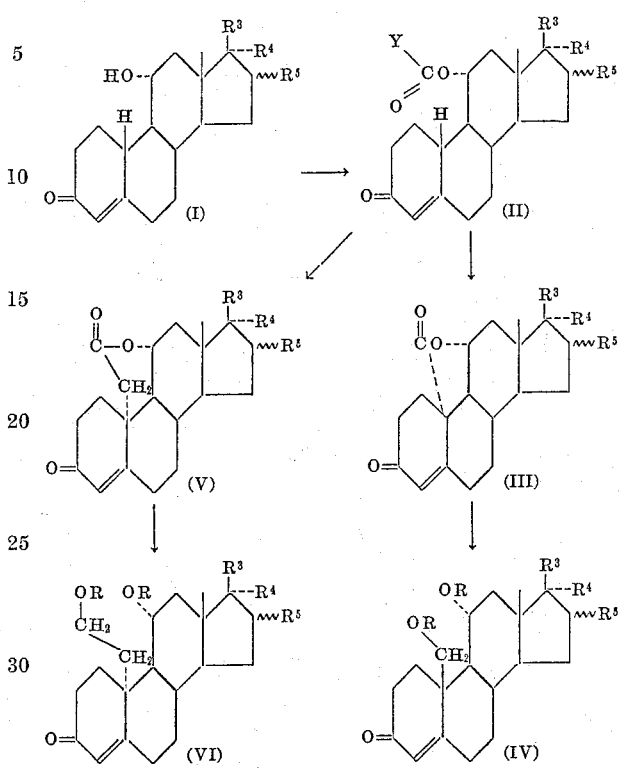

In the above formulae R has the same meaning as heretofore; R$^3$ represents hydroxyl, acyloxy, or acetyl; R$^4$ represents hydrogen, a lower hydrocarbon residue, such as a lower alkyl, alkenyl or alkinyl group, a hydroxyl group or an acyloxy group; R$^5$ represents hydrogen or a lower alkyl group; R$^3$ and R$^4$ together represent a dihydroxy acetone side-chain protected, preferably with a 17,20;-20,21-bismethylenedioxy group; and Y represents an ethoxy group, or a halo-methyl group comprising a halogen atom of atomic weight larger than 19. The acyl groups are of the type described hereinabove.

In proceeding in accordance with the above equation, the starting compound (I), which is an 11α-hydroxy-Δ$^4$-3-keto 10α-steroid, preferably belonging to the androstene and pregnene series, and which may have a number of substituents in the molecule such as lower alkyl group in position 1, 2, 6, 7, 12, 14, 15, 16 and/or 17; acyloxy groups in any of the indicated positions, and the like, is treated with ethyl chloroformate in the presence of pyridine, thus affording the corresponding 11α-cathylate (II: Y=ethoxy) which is then treated with an alkali metal hydride under anhydrous conditions, for example with sodium hydride in dioxane-mineral oil, preferably at reflux temperature for a period of time of the order of 48 hours thus furnishing the corresponding 10α-Δ$^4$-steroid-11α-ol-3-one-19-oic acid (19,11)-lactone (III).

Alternatively, treatment of the starting steroid (I) with an anhydride or a chloride of a haloacetic acid, comprising a halogen atom of atomic weight larger than 19, such as chloroacetic acid or bromoacetic acid, in pyridine, affords the corresponding 11α-haloacetate (II: Y=halomethyl) which is treated with an alkali metal hydride under anhydrous conditions, for example sodium hydride in dioxane-mineral oil, preferably at reflux temperature for a period of time of the order of 2 days thus furnishing the corresponding 10α-Δ$^4$-steroid 11α-ol-3-one-19-carboxylic acid (19α,11)-lactone (V).

Reduction of the Δ⁴-3-keto lactones (III, V) with lithium aluminum hydride affords the corresponding 3β,11α,19-trihydroxy or the corresponding 3β,11α-dihydroxy-19-hydroxymethyl-10α-Δ⁴-steroids which upon selective oxidation of the 3β-allylic hydroxyl group with approximately 1 molar equivalent of 2,3-dichloro-5,6-dicyano 1,4-benzoquinone, in dioxane, preferably at room temperature for approximately 3 hours yield the corresponding 11α,19-dihydroxy or 11α-hydroxy-19-hydroxymethyl-10α-Δ⁴-steroid-3-ketones (IV, VI).

The compounds of the present invention having a secondary hydroxy group for example at C-11, or a primary hydroxyl, for example at C-19, are conventionally acylated in pyridine with a suitable acylating agent, such as a chloride or an anhydride of a hydrocarbon carboxylic acid of the type defined hereinbefore, thus affording the corresponding acylates.

The compounds of the present invention having in the molecule a tertiary hydroxyl group, e.g. at C-17 are conventionally esterified in the present of p-toluenesulfonic acid with an acylating agent, such as acetic anhydride, caproic anhydride, cyclopentylpropionic anhydride or enanthic anhydride, to produce the corresponding esters.

The following specific examples serve to illustrate but are not intended to limit the scope of the present invention:

PREPARATION 1

1 lt. of a sterilized aqueous medium containing 20 g. of peptone and 50 cc. of corn syrup was mixed with 30 cc. of a growing culture of *Rhizopus nigricans*, prepared in the same medium by inoculation with a suspension rich in spores of such fungus which had been grown in agar, and the mixture was stirred for 24 hours, with aeration, at 28° C. At the end of this incubation period the pH of the culture was between 3.0 and 4.0 and, generally, the growth of the fungus was abundant.

A solution of 350 mg. of 19-nor-testosterone acetate in 33 cc. of ethanol was added to the culture thus obtained, and again stirred for 24 hours at 28° C., with aeration. The incubation product was extracted several times with methylene dichloride, the extract was washed with water, dried over anhydrous sodium sulfate, filtered and concentrated under reduced pressure, avoiding overheating.

The concentrated solution was chromatographed on silica and elution with mixtures chloroform-ether gave 11α-hydroxy-19-nor-testosterone 17-acetate.

The compounds listed hereinafter under A, were treated according to the preceding procedure, thus furnishing the corresponding products set forth under B.

| A | B |
|---|---|
| 17α-methyl-19-nortestosterone | 11α-hydroxy-17α-methyl-19-nortestosterone. |
| 17α-ethinyl-19-nortestosterone | 11α-hydroxy-17-α-ethinyl-19-nortestosterone. |
| 19-nor-progesterone | 11α-hydroxy-19-nor-progesterone. |
| 17α-acetoxy-19-nor-progesterone | 11α-hydroxy-17α-acetoxy-19-nor-progesterone. |
| 17,20;20,21-bismethylene-dioxy-19-nor-Δ⁴-pregnen-3-one. | 11α-hydroxy-17,20;20,21-bismethylenedioxy-19-nor-Δ⁴-pregnen-3-one. |
| 16α-methyl-19-nor-progesterone | 11α-hydroxy-16α-methyl-19-nor-progesterone. |
| 19-nor-Δ⁴-androstene-3,17-dione | 11α-hydroxy-19-nor-Δ⁴-androstene-3,17-dione. |
| 17α-vinyl-19-nor-testosterone | 11α-hydroxy-17α-vinyl-19-nor-testosterone. |

Example I

A solution of 1 g. of 11α-hydroxy-19-nor-testosterone 17-acetate in 10 cc. of dry pyridine was added slowly, with caution, to an ice-cold solution of 2 cc. of ethyl chloroformate in 5 cc. of pyridine. After 10 minutes the mixture was allowed to attain room temperature and then poured into 500 cc. of water. The product was extracted with ethyl acetate, the extracts washed successively with dilute hydrochloric acid, water, aqueous sodium bicarbonate solution and water to neutral, then dried and evaporated to dryness. Crystallization of the residue from acetone-hexane afforded 11α-hydroxy-19-nor-testosterone 11-cathylate-17-acetate (Cpd. No. 1).

Example II

A mixture of 1 g. of 11α-hydroxy-19-nor-testosterone 17-acetate, 4 cc. of pyridine and 2 cc. of chloroacetyl chloride was kept at room temperature overnight, poured into ice water, the formed precipitate was filtered, washed with water and dried. Crystallization from acetone-hexane gave 11α-hydroxy-19-nor-testosterone-11-chloroacetate-17-acetate (Cpd. No. 2).

Example III

11α-hydroxy-19-nor-testosterone-17-acetate was treated according to Example II, except that bromoacetyl chloride was used instead of chloroacetyl chloride, thus giving 11α-hydroxy-19-nor-testosterone-11-bromoacetate-17-acetate (Cpd. No. 3).

Example IV

11α-hydroxy-19-nor-testosterone 17-acetate was treated in accordance with Example II, except that chloroacetyl chloride was substituted by iodo acetyl chloride, thus giving 11α-hydroxy-19-nor-testosterone-11-iodoacetate-17-acetate (Cpd. No. 4).

Example V

To a solution of 1 g. of 11α-hydroxy-19-nor-testosterone-11-cathylate-17-acetate (Cpd. No. 1) in 50 cc. of dry dioxane was added a suspension of 1 g. of sodium hydride in 3 cc. of mineral oil. The whole was refluxed for 48 hours, then cooled and poured into water. The non-polar solvents were eliminated by steam distillation, the resulting suspension was extracted with methylene chloride, the extracts washed with water, dried and evaporated to dryness. Crystallization of the residue from acetone-hexane yielded 10α-Δ⁴-androstene-11α,17β-diol-3-one-19-oic-acid (19,11)-lactone (Cpd. No. 5).

Example VI

When treating compounds Nos. 2, 3, and 4 by the procedure described in Example III, there was obtained in each case a compound identical with 10α-Δ⁴-androstene-11α,17β-diol-3-one-19-carboxylic acid (19a,11)-lactone (Cpd. No. 6).

Example VII

A solution of 1 g. of compound No. 5 in 50 cc. of tetrahydrofuran was added over a 30 minute period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 10α-Δ⁴-androstene-3β,11α,17β,19-tetrol (Cpd. No. 7).

Example VIII

A mixture of g. of compound No. 7 in 20 cc. of dioxane, and 1.1 molar equivalents of 2,3-dichloro, 5,6-dicyano, 1,4-benzoquinone was kept at room temperature for 3 hours. The hydroquinone formed during the reaction was filtered off, and the filtrate evaporated to dryness. The residue was dissolved in acetone and filtered through 20 g. of almuina. Crystallization from acetone-hexane gave 10α-Δ4 - androstene - 11α,17β19 - triol - 3 - one (Cpd. No. 8).

Example IX

The compounds listed hereinafter under A were treated according to Example I thus yielding respectively the corresponding compounds set forth under B.

| A | Cpd. No. | B |
|---|---|---|
| 11α-hydroxy-17α-methyl-19-nor-testosterone. | 9 | The 11-cathylate of 11α-hydroxy-17α-methyl-19-nor-testosterone. |
| 11α-hydroxy-17α-vinyl-19-nor-testosterone. | 10 | The 11-cathylate of 11α-hydroxy-17α-vinyl-19-nor-testosterone. |
| 11α-hydroxy-17α-ethinyl-19-nor-testosterone. | 11 | The 11-cathylate of 11α-hydroxy-17α-ethinyl-19-nor-testosterone. |
| 11α-hydroxy-19-nor-progesterone. | 12 | The cathylate of 11α-hydroxy-19-nor-progesterone. |
| 11α-hydroxy-17α-acetoxy-19-nor-progesterone. | 13 | The cathylate of 11α-hydroxy-17α-acetoxy-19-nor-progesterone. |
| 11α-hydroxy-16α-methyl-19-nor-progesterone. | 14 | The cathylate of 11α-hydroxy-16α-methyl-19-nor-progesterone. |
| 11α-hydroxy-17,20;20,21-bismethylenedioxy-19-nor-$\Delta^4$-pregnen-3-one. | 15 | The 11-cathylate of 11α-hydroxy-17,20;20,21-bismethylenedioxy-19-nor-$\Delta^4$-pregnen-3-one. |
| 11α-hydroxy-19-nor-$\Delta^4$-androstene-3,17-dione. | 16 | The 11-cathylate of 11α-hydroxy-19-nor-$\Delta^4$-androstene-3,17-dione. |

*Example X*

The starting compounds of Example IX were treated according to Example II thus yielding respectively:

Cpd. No.—
17. 11α-hydroxy-17α-methyl-19-nor-testosterone 11-chloroacetate,
18. 11α-hydroxy-17α-vinyl-19-nor-testosterone-11-chloroacetate,
19. 11α-hydroxy-17α-ethinyl-19-nor-testosterone-11-chloroacetate,
20. 11α-hydroxy-19-nor-progesterone-chloroacetate,
21. 11α-hydroxy-17α-acetoxy-19-nor-progesterone-chloroacetate,
22. 11α-hydroxy-16α-methyl-19-nor-progesterone-chloroacetate,
23. 11α-hydroxy-17,20;20,21-bismethylenedioxy-19-nor-$\Delta^4$-pregnen-3-one-chloroacetate,
24. 11α-hydroxy-19-nor-$\Delta^4$-androstene-3,17-dione-chloroacetate.

*Example XI*

The compounds Nos. 9 to 16, inclusive, were treated according to Example V, thus affording respectively:

Cpd. No.—
25. 17α-methyl-10α-$\Delta^4$-androstene-11α-17β-diol-3-one-19-oic acid (19,11)-lactone.
26. 17α-vinyl-10α-$\Delta^4$-androstene-11α,17β-diol-3-one-19-oic acid (19,11)-lactone.
27. 17α-ethinyl-10α-$\Delta^4$-androstene-11α,17β-diol-3-one-19-oic acid (19,11)-lactone
28. 10α-$\Delta^4$-pregnen-11α-ol-3,20-dione-19-oic acid (19,11)-lactone
29. 17α-acetoxy-10α-$\Delta^4$-pregnen-11α-ol-3,20-dione-19-oic acid (19,11)-lactone
30. 16α-methyl-10α-$\Delta^4$-pregnen-11α-ol-3,20-dione-19-oic acid (19,11)-lactone
31. 17,20;20,21-bismethylenedioxy-10α-$\Delta^4$-pregnen-11α-ol-3-one-19-oic acid (19,11)-lactone
32. 10α-$\Delta^4$-androsten-11α-ol-3,17-dione-19-oic acid (19,11)-lactone

*Example XII*

The compounds Nos. 17 to 24, inclusive, were treated according to Example V, thus yielding respectively:

Cpd. No.—
33. 17α-methyl-10α-$\Delta^4$-androstene-11α,17β-diol-3-one-19-carboxylic acid (19a,11)-lactone
34. 17α-vinyl-10α-$\Delta^4$-androstene-11α,17β-diol-3-one-19-carboxylic acid (19a,11)-lactone
35. 17α-ethinyl-10α-$\Delta^4$-androstene-11α,17β-diol-3-one-19-carboxylic acid (19a,11)-lactone
36. 10α-$\Delta^4$-pregnen-11α-ol-3,20-dione-19-carboxylic-acid (19a,11)-lactone
37. 17α-acetoxy-10α-$\Delta^4$-pregnen-11α-ol-3,20-dione-19-carboxylic acid (19a,11)-lactone
38. 16α-methyl-10α-$\Delta^4$-pregnen-11α-ol-3,20-dione-19-carboxylic acid (19a,11)-lactone
39. 17,20;20,21-bismethylenedioxy-10α-$\Delta^4$-pregnen-11α-ol-3-one-19-carboxylic acid (19a,11)-lactone
40. 10α-$\Delta^4$-androsten-11α-ol-3,17-dione-19-carboxylic-acid (19a,11)-lactone

*Example XIII*

The compounds Nos. 25 to 32, inclusive, were treated according to Example VII, thus yielding respectively:

Cpd. No.—
41. 17α-methyl-10α-$\Delta^4$-androstene-3β,11α,17β,19-tetrol
42. 17α-vinyl-10α-$\Delta^4$-androstene-3β,11α,17β,19-tetrol
43. 17α-ethinyl-10α-$\Delta^4$-androstene-3β,11α,17β,19-tetrol
44. 10α-$\Delta^4$-pregnene-3β,11α,19,20β-tetrol
45. 10α-$\Delta^4$-pregnene-3β,11α,17α,19,20β-pentol
46. 16α-methyl-10α-$\Delta^4$-pregnene-3β,11α,19,20β-tetrol
47. 17,20;20,21-bismethylenedioxy-10α-$\Delta^4$-pregnene-3β,11α,19-triol
48. 10α-androstene-3β,11α,17β,19-tetrol

*Example XIV*

The compounds Nos. 33 to 40, inclusive, were treated according to Example VII, thus yielding respectively:

Cpd. No.—
49. 19-hydroxymethyl-17α-methyl-10α-$\Delta^4$-androstene-3β,11α,17β-triol
50. 19-hydroxymethyl-17α-vinyl-10α-$\Delta^4$-androstene-3β,11α,17β-triol
51. 19-hydroxymethyl-17α-ethinyl-10α-$\Delta^4$-androstene-3β,11α,17β-triol
52. 19-hydroxymethyl-10α-$\Delta^4$-pregnene-3β,11α,20β-triol
53. 19-hydroxymethyl-10α-$^4\Delta$-pregnene-3β,11α,17α,20β-tetrol
54. 19-hydroxymethyl-16α-methyl-10α-$\Delta^4$-pregnene-3β,171α,20β-triol
55. 19-hydroxymethyl-17,20;20,21-bismethylenedioxy-10α-$\Delta^4$-pregnene-3β,11α-diol
56. 19-hydroxymethyl-10α-$\Delta^4$-androstene-3β,11α,17β-triol

*Example XV*

The compounds Nos. 41 to 56, inclusive, were treated according to Example VIII, thus furnishing respectively:

Cpd. No.—
57. 17α-methyl-10α-$\Delta^4$-androstene-11α,17β,19-triol-3-one
58. 17α-vinyl-10α-$\Delta^4$-androstene-11α,17β,19-triol-3-one
59. 17α-ethinyl-10α-$\Delta^4$-androstene-11α,17β,19-triol-3-one
60. 10α-$\Delta^4$-pregnene-11α,19-20β-triol-3-one
61. 10α-$\Delta^4$-pregnene-11α,17α,19,20β-tetrol-3-one
62. 16α-methyl-10α-$\Delta^4$-pregnene-11α,19,20β triol-3-one
63. 17,20;20,21-bismethylenedioxy-10α-$\Delta^4$-pregnene-11α,19-diol-3-one
64. 10α-$\Delta^4$-androstene-11α,17β,19-triol-3-one
65. 19-hydroxymethyl-17α-methyl-10α-$\Delta^4$-androstene-11α,17β-diol-3-one
66. 19-hydroxymethyl-17α-vinyl-10α-$\Delta^4$-androstene-11α,17β-diol-3-one 67. 19-hydroxymethyl-17α-ethinyl-10α-Δ⁴-androstene-11α,17β-diol-3-one
68. 19-hydroxymethyl-10α-Δ⁴-pregnene-11α,20β-diol-3-one
69. 19-hydroxymethyl-10α-Δ⁴-pregnene-11α,17α,20β-triol-3-one
70. 19-hydroxymethyl-16α-methyl-10α-Δ⁴-pregnene-11α,20β-diol-3-one
71. 19-hydroxymethyl-17,20;20,21-bismethylenedioxy-10α-Δ⁴-pregnene-11α-ol-3-one
72. 19-hydroxqmethyl-10α-Δ⁴-androstene 11α,17β-diol-3-one

*Example XVI*

A mixture of 1 g. of compound No. 8, 4 cc. of pyridine and 2 cc. of acetic anhydride was kept at room temperature overnight, poured into ice water, the formed precipitate was filtered, washed with water and dried. Crystallization from acetone-hexane gave 10α-Δ⁴-androstene-11α,17β,19-triol-3-one triacetate (Cpd. No. 73).

By the same procedure there were treated compounds Nos. 57, 58, 65 and 66, thus yielding respectively:

Cpd. No.—
  74. 17α-methyl-10α-Δ⁴-androstene-11α,17β,19-triol-3-one 11,19-diacetate,
  75. 17α-vinyl-10α-Δ⁴-androstene-11α,17β,19-triol-3-one 11,19-diacetate,
  76. 19-acetoxymethyl-17α-methyl-10α-Δ⁴-androstene-11α,17β-diol-3-one 11-acetate,
  77. 19-acetoxymethyl-17α-vinyl-10α-Δ⁴ androstene-11α,17β-diol-3-one 11-acetate,

*Example XVII*

The starting compounds of Example XVI were treated following exactly the procedure described in that example, except that acetic anhydride was substituted by caproic anhydride, propionic anhydride, enanthic anhydride and cyclopentylpropionic anhydride thus affording respectively the corresponding caproates, propionates, enanthates and cyclopentylpropionates of said starting compounds.

*Example XVIII*

To a solution of 5 g. of compound No. 57 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 17α-methyl-10α-Δ⁴-androstene-11α,17β,19-triol-3-one tricaproate (Cpd. No. 78).

The compounds Nos. 58, 59, 65, 66 and 67 were treated according to the above procedure, thus yielding respectively:

Cpd. No.—
  79. 17α - vinyl - 10α-Δ⁴-androstene-11α,17β,19-triol-3-one tricaproate
  80. 17α - ethinyl-10α-Δ⁴-androstene-11α,17β,19-triol-3-one tricaproate
  81. 19 - caproxymethyl - 17α - methyl-10α-Δ⁴-androstene-11α,17β-diol-3-one dicaproate
  82. 19 - carpoxymethyl-17α-vinyl-10α-Δ⁴-androstene-11α,17β-diol-3-one dicaproate
  83. 19-caproxymethyl - 17α - ethinyl-10α-Δ⁴-androstene-11α,17β-diol-3-one dicaproate

*Example XIX*

The starting compounds of Example XVIII were treated following exactly the procedure described in that example, except that caproic anhydride was substituted by acetic anhydride, propionic anhydride, enanthic anhydride and cyclopentylpropionic anhydride thus affording respectively the corresponding acetates, propionates, enanthates and cyclopentylpropionates of said starting compounds.

*Example XX*

The procedures of Examples V and VI were repeated except that potassium hydride was used instead of sodium hydride, thus giving exactly the same compounds.

*Example XXI*

The procedure of Examples II and X were repeated, except that chloroacetyl chloride was substituted by chloro acetic anhydride thus affording identical results.

*Example XXII*

The compound No. 6 was treated successively according to Examples VII and VIII thus furnishing respectively: 19-hydroxymethyl - 10α - Δ⁴ - androstene-3β,11α,17β-triol (Cpd. No. 84), and 19-hydroxymethyl-10α-Δ⁴-androstene-11α,17β-diol-3-one (Cpd. No. 85).

I claim:
1. A compound of the following formula:

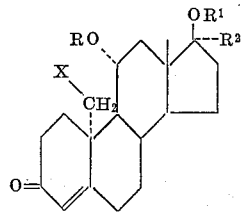

wherein X is selected from the group consisting of —OR and —CH₂—OR; R is selected from the group consisting of hydrogen and a hydrocarbon carboxylic acyl group of less than 12 carbon atoms; R¹ is a member of the group consisting of hydrogen and a hydrocarbon carboxylic acyl group of less than 12 carbon atoms; and R² is selected from the group consisting of hydrogen, a lower alkyl group, a lower alkenyl group and a lower alkinyl group.

2. 10α-Δ⁴-androstene-11α,17β,19-triol-3-one.
3. 17α - methyl - 10α-Δ⁴-androstene-11α,17β,19-triol-3-one.
4. 17α-vinyl-10α - Δ⁴ - androstene-11α,17β,19-triol-3-one.
5. 17α-ethinyl-10α - Δ⁴ - androstene-11α,17β,19-triol-3-one.
6. 19 - hydroxymethyl-10α-Δ⁴-androstene-11α,17β-diol-3-one.
7. 19-hydroxymethyl - 17α - methyl-10α-Δ⁴-androstene-11α,17β-diol-3-one.
8. 19 - hydroxymethyl - 17α - vinyl-10α-Δ⁴-androstene-11α,17β-diol-3-one.
9. 19-hydroxymethyl - 17α - ethinyl-10α-Δ⁴-androstene-11α,17β-diol-3-one.
10. A process for the preparation of a steroid selected from the group consisting of 10α-Δ⁴-11α-ol-3-one-19-oic acid (19,11)-lactones of the androstene and pregnene series which comprises treating the corresponding 11α-hydroxy-Δ⁴ - 3 - keto-19-nor-steroid 11-cathylate with an alkali metal hydride under anhydrous conditions.
11. A process according to claim 10 wherein said alkali metal hydride is sodium hydride.
12. A process for the preparation of a steroid selected from the group consisting of 10α-Δ⁴-11α-ol-3-one-19-oic acid (19,11)-lactones of the androstene and pregnene series which comprises treating the corresponding 11α-hydroxy-Δ⁴-3-keto-19-nor-steroid with ethyl chloroformate in the presence of pyridine to form the corresponding 11α-hydroxy-Δ⁴-3-keto - 19 - nor-steroid 11-cathylate, and treating said cathylate with an alkali metal hydride under anhydrous conditions to form said lactone.
13. A process according to claim 12 wherein said alkali metal hydride is sodium hydride.
14. A process for the preparation of a steroid selected from the group consisting of 10α-Δ⁴-11α-ol-3-one-19-carboxylic acid (19α,11)-lactones of the androstene and pregnene series which comprises treating the corresponding 11α-hydroxy-Δ⁴-3-keto - 19 - nor - steroid 11-haloacetate, wherein the halogen atom has an atomic weight greater than 19, with an alkali metal hydride under anhydrous conditions.

15. A process according to claim 14 wherein said alkali metal hydride is sodium hydride and said haloacetate is the chloroacetate.

16. A process for the preparation of a steroid selected from the group consisting of 10α-Δ⁴-11α-ol-3-one-19-carboxylic acid (19α,11)-lactones of the androstene and pregnene series which comprises treating the corresponding 11α-hydroxy-Δ⁴-3-keto - 19 - nor - steroid with a reagent selected from the group consisting of chlorides and anhydrides of haloacetic acids wherein the halogen atom has an atomic weight greater than 19, in the presence of pyridine, to form the corresponding 11α-hydroxy-Δ⁴-3-keto-19-nor-steroid 11-haloacetate, and treating said haloacetate with an alkali metal hydride under anhydrous conditions to form said lactone.

17. A process according to claim 16 wherein said reagent is chloroacetyl chloride and said alkali metal hydride is sodium hydride.

18. A process according to claim 16 wherein said reagent is chloroacetic anhydride and said alkali metal hydride is sodium hydride.

References Cited in the file of this patent
UNITED STATES PATENTS

| | | |
|---|---|---|
| 2,864,831 | Eppstein et al. | Dec. 16, 1958 |
| 3,076,828 | Wettstein et al. | Feb. 5, 1963 |